United States Patent
Yoo et al.

(10) Patent No.: US 10,855,406 B2
(45) Date of Patent: Dec. 1, 2020

(54) APPARATUS AND METHOD FOR SCHEDULING UPLINK TRANSMISSION IN WIRELESS COMMUNICATION SYSTEM

(71) Applicant: Samsung Electronics Co., Ltd., Suwon-si (KR)

(72) Inventors: Hwa Sun Yoo, Seoul (KR); Hyoungmin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/103,255

(22) Filed: Aug. 14, 2018

(65) Prior Publication Data
US 2019/0058555 A1  Feb. 21, 2019

(30) Foreign Application Priority Data
Aug. 18, 2017  (KR) .................. 10-2017-0104879

(51) Int. Cl.
| | |
|---|---|
| H04W 4/00 | (2018.01) |
| H04L 1/18 | (2006.01) |
| H04L 1/16 | (2006.01) |
| H04L 5/00 | (2006.01) |
| H04W 28/02 | (2009.01) |
| H04W 72/04 | (2009.01) |
| H04W 72/14 | (2009.01) |
| H04W 74/06 | (2009.01) |

(Continued)

(52) U.S. Cl.
CPC .......... *H04L 1/1829* (2013.01); *H04L 1/1685* (2013.01); *H04L 1/1887* (2013.01); *H04L 5/0055* (2013.01); *H04L 5/0091* (2013.01); *H04W 28/0278* (2013.01); *H04W 72/0406* (2013.01); *H04W 72/14* (2013.01); *H04W 74/06* (2013.01); *H04W 80/06* (2013.01); *H04L 5/0023* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 2006/0203712 A1* | 9/2006 | Lim .................. | H04J 3/1682 370/208 |
| 2011/0205997 A1* | 8/2011 | Chun ................ | H04L 5/0007 370/329 |
| 2012/0113942 A1 | 5/2012 | Kim | |

(Continued)

FOREIGN PATENT DOCUMENTS

| | | |
|---|---|---|
| WO | 2016/032077 A1 | 3/2016 |
| WO | 2016/190591 A1 | 12/2016 |

OTHER PUBLICATIONS

Ericsson; "Autonomous UL access for LAA unlicensed cells"; 3GPP TSG RAN WG1 Meeting #89; Hangzhou, P.R. China; May 15-19, 2017; R1-1708963.

(Continued)

*Primary Examiner* — Zewdu A Beyen
(74) *Attorney, Agent, or Firm* — Jefferson IP Law, LLP (57) ABSTRACT

A method for operating a base station (BS) in a wireless communication system is provided. The method includes transmitting, to a terminal, downlink data, allocating uplink resources for uplink data related to the downlink data without any request from the terminal, and transmitting control information indicating the uplink resources.

16 Claims, 9 Drawing Sheets

(51) Int. Cl.
*H04W 80/06* (2009.01)
*H04L 5/14* (2006.01)

(56) References Cited

U.S. PATENT DOCUMENTS

| | | | | |
|---|---|---|---|---|
| 2015/0351139 | A1* | 12/2015 | Zhang | H04W 16/32 |
| | | | | 370/329 |
| 2017/0034845 | A1* | 2/2017 | Liu | H04L 1/0003 |
| 2017/0201393 | A1 | 7/2017 | Gaal et al. | |
| 2017/0202047 | A1 | 7/2017 | Tiwari et al. | |
| 2018/0146410 | A1* | 5/2018 | Cho | H04W 48/20 |
| 2018/0199359 | A1* | 7/2018 | Cao | H04W 74/006 |
| 2018/0270839 | A1* | 9/2018 | Loehr | H04W 72/10 |

OTHER PUBLICATIONS

LG Electronics; "Discussion on grant-based and grant-free UL transmissions for latency reduction"; 3GPP TSG RAN WG1 Meeting #88; Athens, Greece; Feb. 13-17, 2017; R1-1702490.

LG Electronics; "Discussion on HARQ timing and resource for NR"; 3GPP TSG RAN WG1 NR-AdHoc Meeting; Spokane, WA, USA; Jan. 16-20, 2017; R1-1700508.

NTT Docomo, Inc., Nokia, Alcatel-Lucent Shanghai Bell; "NW requested BSR for NR"; 3GPP TSG-RAN WG2 Meeting 98; Hangzhou, China; May 15-19, 2017; R2-1704340.

Intel Corporation; "Protocol impact of fast uplink access solution for latency reduction"; 3GPP TSG-RAN WG2 Meeting #91; Beijing, China; Aug. 24-28, 2015; R2-153294.

Intel Corporation; "Scheduling request design for NR"; 3GPP TSG RAN WG1 Meeting #88bis; Spokane, WA, USA; Apr. 3-7, 2017; R1-1704760.

European Office Action dated Dec. 13, 2018; References #: P20559EP; Application: 18189336.3-1215.

European Office Action dated Oct. 2, 2019, issued in European Patent Application No. 18189336.3.

European Office Action dated Mar. 3, 2020, Issued in European Application No. 18 189 336.3.

Indian Office Action dated Aug. 18, 2020, issued in Indian Application No. 201814030455.

European Search Report dated Oct. 12, 2020, issued in European Application No. 18189336.3.

\* cited by examiner

APPARATUS AND METHOD FOR SCHEDULING UPLINK TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2017-0104879, filed on Aug. 18, 2017, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for scheduling uplink transmission in a wireless communication system.

2. Description of the Related Art

The internet, which is a human centered connectivity network where humans generate and consume information, is now evolving to the internet of things (IoT) where distributed entities, such as things, exchange and process information without human intervention. The internet of everything (IoE), which is a combination of the IoT technology and Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In the case of an IoT environment, it is expected that many devices exist within one base station (BS) coverage. Further, since it is hard to expect charging of a battery by the user due to characteristics of non-portability, it is required to reduce battery consumption in order to maintain an operational state thereof for a long time. Accordingly, various solutions to reduce overhead for control signaling required for communication are being discussed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for efficiently scheduling uplink transmission in a wireless communication system.

Another aspect of the disclosure is to provide an apparatus and a method for allocating resources to uplink transmission expected in a wireless communication system.

Another aspect of the disclosure is to provide an apparatus and a method for allocating uplink resources without any request (unsolicited) in a wireless communication system.

Additional aspects will be set forth in part in the description which follows and, in part, will be apparent from the description, or may be learned by practice of the presented embodiments.

In accordance with an aspect of the disclosure, a method of operating a base station (BS) in a wireless communication system is provided. The method includes transmitting, to a terminal, downlink data, allocating uplink resources for uplink data related to the downlink data without any request from the terminal, and transmitting control information indicating the uplink resources.

In accordance with another aspect of the disclosure, a method for operating a terminal in a wireless communication system is provided. The method includes receiving downlink data from a base station (BS), and receiving control information indicating uplink resources for uplink data related to the downlink data. The uplink resources may be allocated by the BS without any request from the terminal.

In accordance with another aspect of the disclosure, an apparatus of a BS in a wireless communication system is provided. The apparatus includes a transceiver, and at least one processor connected to the transceiver and configured to transmit downlink data to a terminal, allocate uplink resources for uplink data related to the downlink data without any request from the terminal, and transmit control information indicating the uplink resources.

In accordance with another aspect of the disclosure, an apparatus for a terminal in a wireless communication system is provided. The apparatus includes a transceiver, and at least one processor connected to the transceiver and configured to receive downlink data from a Base Station (BS), and receive control information indicating uplink resources for uplink data related to the downlink data. The uplink resources may be allocated by the BS without any request from the terminal.

An apparatus and a method according to various embodiments of the disclosure can reduce signal overhead for resource allocation and an uplink transmission delay by allocating uplink resources without any request from a terminal according to a prediction of uplink transmission.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to an apparatus and a method for scheduling uplink transmission in a wireless communication system. Specifically, the disclosure describes technology for allocating resources for uplink transmission expected in the wireless communication system.

The terms referring to a signal used in the following description, the terms referring to a channel, the terms referring to control information, the terms referring to network entities, and the terms referring to elements of a device are used only for convenience of description. Accordingly, the disclosure is not limited to the following terms and other terms having the same technical meaning may be used.

Further, the disclosure describes various embodiments using the terms used by some communication standards (for example, $3^{rd}$ generation partnership project (3GPP)), but this is only an example. Various embodiments of the disclosure may be easily modified and applied to other communication systems.

Figure 1:
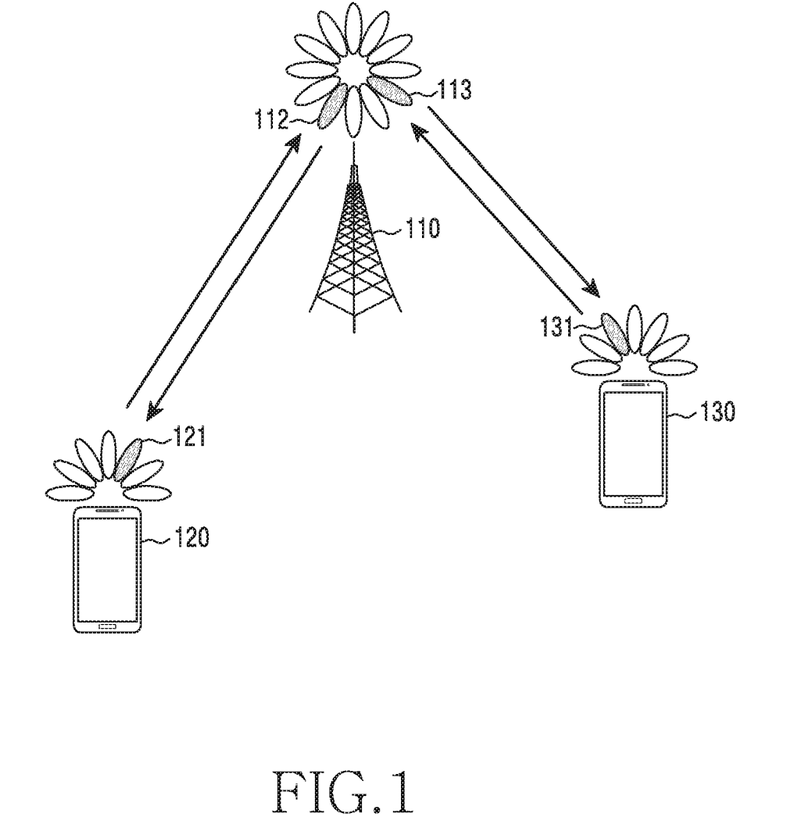
FIG. 1 illustrates a wireless communication system according to various embodiments of the disclosure.

FIG. 1 illustrates a wireless communication system according to various embodiments of the disclosure.

Referring to FIG. 1, a base station (BS) 110, a terminal 120, and a terminal 130 are illustrated as some of the nodes using a wireless channel in a wireless communication system. FIG. 1 illustrates only one BS, but another BS, which is the same as or similar to the BS 110, may be further included.

The BS 110 is a network infrastructure element that provides wireless access to the terminals 120 and 130. The BS 110 has coverage defined for a predetermined geographical region based on the distance at which a signal can be transmitted. The BS 110 may be referred to as an "access point (AP)," an "evolved node B (eNB)," a "$5^{th}$ generation (5G) node," a "wireless point," a "transmission/reception point (TRP)," or another term having an equivalent meaning thereto as well as a "BS."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 may be a device that performs machine-type communication (MTC), and may not be carried by the user. Each of the terminals 120 and 130 may be referred to as a "user equipment (UE)," a "mobile station," a "subscriber station," a "remote terminal," a "wireless terminal," a "user device," or other terms having the equivalent technical meaning, as well as a "terminal."

The BS 110, the terminal 120, and the terminal 130 may transmit and receive wireless signals in millimeter-wave (mm Wave) bands (for example, 28 GHz, 30 GHz, 38 GHz, and 60 GHz). At this time, in order to increase a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or beam management procedure. After the serving beams 112, 113, 121, and 131 are selected, communication may be performed through resources having a quasi-co-located (QCL) relation with resources through which the serving beams 112, 113, 121, and 131 are transmitted.

Figure 2:
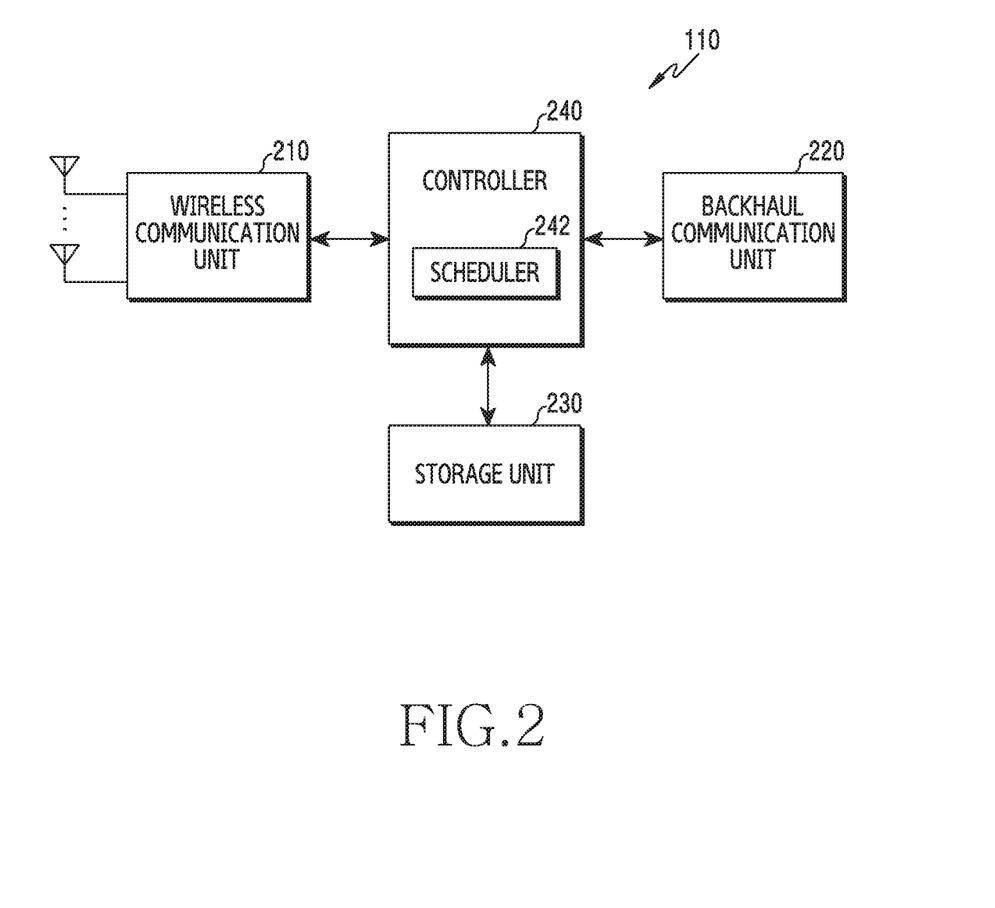
FIG. 2 illustrates a configuration of a BS in a wireless communication system according to various embodiments of the disclosure.

FIG. 2 illustrates the configuration of a BS in a wireless communication system according to various embodiments of the disclosure.

The configuration illustrated in FIG. 2 may be understood as the configuration of the BS 110. The suffix "-unit" or "-er" used hereinafter may refer to a unit for processing at least one function or operation, and may be implemented as hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving signals through a wireless channel. For example, the wireless communication unit 210 performs a function of conversion between a baseband signal and a bit stream according to a physical layer standard of the system. For example, when data is transmitted, the wireless communication unit 210 generates complex symbols by encoding and modulating a transmission bit stream. Also, when data is received, the wireless communication unit 210 restores a reception bit stream by demodulating and decoding a baseband signal. Also, the wireless communication unit 210 up-converts a baseband signal into a radio-frequency (RF) band signal and transmits the same through an antenna, and down-converts an RF band signal received through an antenna into a baseband signal.

To this end, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include a plurality of transmission/reception paths. In addition, the wireless communication unit 210 may include at least one antenna array consisting of a plurality of antenna elements. On the hardware side, the wireless communication unit 210 may include a digital unit and an analog unit, and the analog unit may include a plurality of sub-units according to operation power, operation frequency, and the like.

The wireless communication unit 210 transmits and receives the signal as described above. Accordingly, some or all of the wireless communication unit 210 may be referred to as a "transmitter," a "receiver," or a "transceiver." Also, the transmission and reception performed through a wireless channel, which is described in the following descriptions, may be understood to mean that the above-described processing is performed by the wireless communication unit 210.

The backhaul communication unit 220 provides an interface for performing communication with other nodes within the network. That is, the backhaul communication unit 220 converts a bit stream transmitted from the BS to another node, for example, another access node, another BS, a higher node, or a core network, into a physical signal, and converts a physical signal received from another node into a bit stream.

The storage unit 230 stores a basic program for the operation of the BS, an application program, and data such as configuration information. The storage unit 230 may be configured as a volatile memory, a non-volatile memory, or a combination of volatile memory and non-volatile memory. Further, the storage unit 230 provides stored data in response to a request from the controller 240.

The controller 240 controls the overall operation of the BS. For example, the controller 240 transmits and receives a signal through the wireless communication unit 210 or the backhaul communication unit 220. Further, the controller 240 records data in the storage unit 230 and reads the recorded data. The controller 240 may perform functions of protocol stack required in the communication standards. To this end, the controller 240 may include at least one processor. According to various embodiments, the controller 240 may include a scheduler 242 for allocating resources to the terminal (for example, the terminal 120 or the terminal 130). The scheduler 242 may correspond to an instruction set or code stored in the storage unit 230, and may be instructions/code that reside at least temporarily in the controller 240, a storage space that stores the instructions/code, or part of the circuitry included in the controller 240.

According to various embodiments, the controller 240 may perform control to transmit downlink data to the terminal (for example, the terminal 120), allocate uplink resources for uplink data related to the downlink data without any request from the terminal, and transmit control information indicating the uplink resources. To this end, the controller 240 may identify information related to data units (for example, a header) of a layer including a resource allocation function of the scheduler 242 and another layer and provide the identification information to the scheduler 242. For example, the controller 240 may control the BS to perform the operations according to various embodiments described below.

Figure 3:
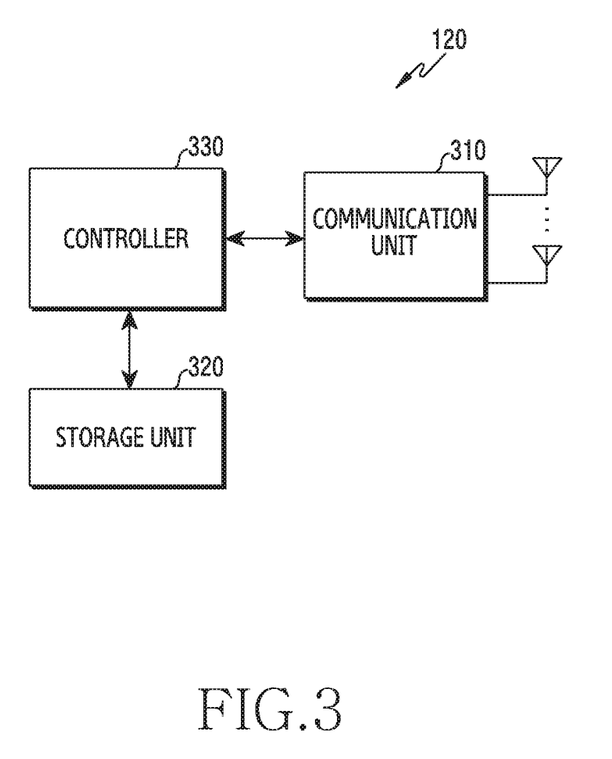
FIG. 3 illustrates a configuration of a terminal in a wireless communication system according to various embodiments of the disclosure.

FIG. 3 illustrates the configuration of a terminal in a wireless communication system according to various embodiments of the disclosure.

The configuration illustrated in FIG. 3 may be understood as the configuration of the terminal 120. The suffix "-unit" or "-er" used hereinafter may refer to a unit for processing at least one function or operation, and may be implemented as hardware, software, or a combination of hardware and software.

Referring to FIG. 3, the terminal includes a communication unit 310, a storage unit 320, and a controller 330.

The communication unit 310 performs functions for transmitting/receiving a signal through a wireless channel. For example, the communication unit 310 performs a function of conversion between a baseband signal and a bit stream according to a physical layer standard of the system. For example, when data is transmitted, the communication unit 310 generates complex symbols by encoding and modulating a transmission bit stream. Also, when data is received, the communication unit 310 restores a reception bit stream by demodulating and decoding a baseband signal. Also, the communication unit 310 up-converts a baseband signal into an RF band signal and transmits the same through an antenna, and down-converts an RF band signal received through an antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission/reception paths. In addition, the communication unit 310 may include at least one antenna array consisting of a plurality of antenna elements. On the hardware side, the communication unit 310 may include a digital circuit and an analog circuit (for example, a radio frequency integrated circuit (RFIC)). The digital circuit and the analog circuit may be implemented as one package. The communication unit 310 may include a plurality of RF chains. The communication unit 310 may perform beamforming.

The communication unit 310 transmits and receives the signal as described above. Accordingly, all or some of the communication unit 310 may be referred to as a "transmitter," a "receiver," or a "transceiver." Also, the transmission and reception performed through a wireless channel, which is described in the following descriptions, may be understood to mean that the above-described processing is performed by the communication unit 310.

The storage unit 320 stores a basic program for the operation of the terminal, an application program, and data such as configuration information. The storage unit 320 may be configured as volatile memory, non-volatile memory, or a combination of volatile memory and non-volatile memory. Further, the storage unit 320 provides stored data in response to a request from the controller 330.

The controller 330 controls the overall operations of the terminal. For example, the controller 330 transmits and receives a signal through the communication unit 310. Further, the controller 330 records data in the storage unit 320 and reads the recorded data. The controller 330 may perform functions of a protocol stack required in the communication standards. To this end, the controller 330 may include at least one processor or microprocessor, or may play the part of the processor. Further, the part of the communication unit 310 or the controller 330 may be referred to as a communication processor (CP).

According to various embodiments, the controller 30 may perform control to receive downlink data from the BS (for example, the BS 110) and receive control information indicating uplink resources for uplink data related to the downlink data. At this time, the uplink resources may be allocated by the BS without any request from the terminal. For example, the controller 330 may control the terminal to perform the operations described below according to various embodiments.

Figure 4:
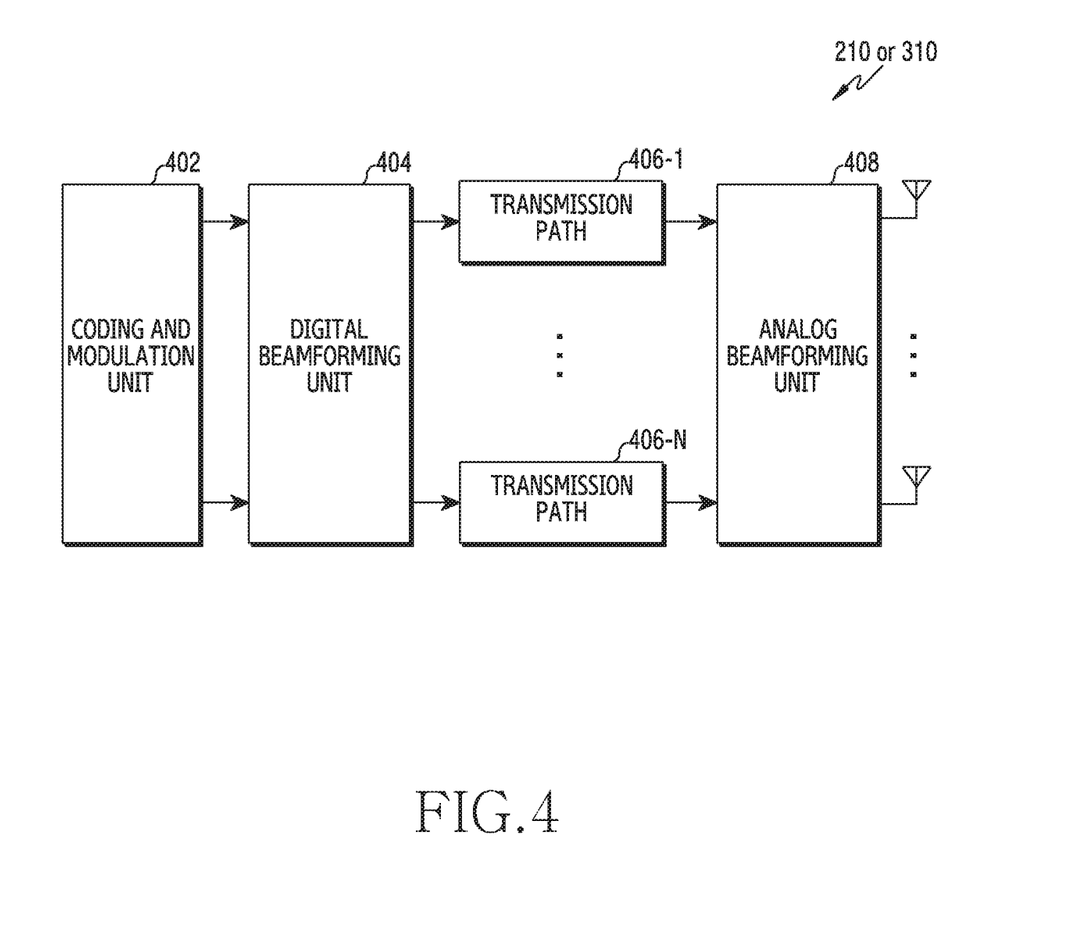
FIG. 4 illustrates a configuration of a communication unit in a wireless communication system according to various embodiments of the disclosure.

FIG. 4 illustrates the configuration of the communication unit in the wireless communication system according to various embodiments of the disclosure.

FIG. 4 illustrates an example of the detailed configuration of the wireless communication unit 210 of FIG. 2 or the communication unit 310 of FIG. 3. Specifically, FIG. 4 illustrates elements for performing beamforming as the part of the wireless communication unit 210 of FIG. 2 or the communication unit 310 of FIG. 3.

Referring to FIG. 4, the wireless communication unit 210 or the communication unit 310 includes a coding and modulation unit 402, a digital beamforming unit 404, a plurality of transmission paths 406-1 to 406-N, and an analog beamforming unit 408.

The coding and modulation unit 402 performs channel encoding. For the channel encoding, at least one of a low-density parity check (LDPC) code, a convolution code, and a polar code may be used. The coding and modulation unit 402 generates modulation symbols by performing constellation mapping.

The digital beamforming unit 404 performs beamforming for a digital signal (for example, modulation symbols). To this end, the digital beamforming unit 404 multiplies the modulation symbols by beamforming weighted values. The beamforming weighted values may be used for changing the size and phase of the signal, and may be referred to as a "precoding matrix" or a "precoder." The digital beamforming unit 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N converts the digitally beamformed digital signals into analog signals. To this end, each of the plurality of transmission paths 406-1 to 406-N may include an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog beamforming unit 408 performs beamforming on analog signals. To this end, the digital beamforming unit 404 multiplies the analog signals by beamforming weighted values. The beamformed weighted values are used to change the size and phase of the signal.

In the case of a system having a physical channel for a request for resources of each terminal like long term evolution (LTE), the terminal may make a request for uplink resources through the following procedure. In order to use uplink and downlink resources, the terminal may be required to acquire a grant (resource grant) for the corresponding resources from the BS. When uplink data to be transmitted is generated while downlink data is received through downlink resources, the terminal may inform the BS that there is uplink data to be transmitted by transmitting a signal through a separate scheduling request channel or bandwidth request channel allocated to the terminal. When the signal is received through the scheduling request channel allocated to the terminal, the BS allocates uplink resources and transmits a grant message to the terminal so as to perform control to transmit uplink data.

The above-described general uplink resource request procedure is suitable for a large-capacity data service such as general LTE. However, when many terminals within a cell of the BS should simultaneously access or when tens of thousands to hundreds of thousands of terminals should be accepted, for example, in the case of narrow band-internet of things (NB-IoT), which is a kind of cellular IoT service, a call flow supported by the standard to supply the terminal at low cost is simple. Accordingly, in the case of NB-IoT, the number of physical channels may be limited and a terminal-specific resource allocation channel (for example, a dedicated scheduling request (D-SR) channel) may not be separately allocated. In another example, in the case of enhanced machine type communication (eMTC), which is another cellular IoT service, it is possible to designate a resource allocation channel to each terminal, but many low-cost terminals may simultaneously access or many subscribers may exist within the same cell and, in this case, a scheme for designating separate resource allocation channels to all IoT terminals cannot be guaranteed.

In such a limitation, when uplink data to be transmitted is generated while downlink resources are being received or in a reception standby state of downlink resources, the terminal may inform the BS that the terminal has uplink information to be transmitted and acquire necessary uplink resources by performing a random access channel (RACH) procedure in the similar way to that in initial call access. Specifically, when information to be transmitted through uplink is generated, the terminal randomly selects an RACH preamble first and transmits the selected RACH preamble through an RACH region at a predetermined time point. The BS detects the RACH preamble. However, since it cannot be determined who transmitted the RACH preamble and how many resources are necessary through the RACH preamble alone, the BS grants uplink resources having a relatively small size through a random access response (RAR) message. Accordingly, the terminal transmits information on a delimiter (for example, a cell-radio network temporary identifier (C-RNTI)) by which the BS can recognize the terminal through granted uplink resources using the RAR and information (for example, a buffer status report (BSR)) on the size of data to be transmitted through uplink. The BS may detect who will transmit uplink data and how much uplink data will be transmitted through the received information. Accordingly, the BS may transmit grant information of uplink resources to the terminal, and the terminal may transmit uplink data through the allocated uplink resources.

The resource request scheme using the RACH may generate a loss in the following aspect. In order to inform that uplink resources are necessary, the terminal is required to wait for generation of an RACH preamble opportunity and transmit an RACH preamble at a time point at which the opportunity is generated. Further, since it cannot be determined who requires uplink resources and how many uplink resources are necessary through the RACH preamble alone, the terminal may temporarily receive only predefined small sized-uplink resources first and then transmit additional information through the small-sized resources.

The complexity of such a procedure may act as a delay in transmission of uplink resources and thus decrease data throughput of the terminal. Further, since the RACH procedure is performed as each terminal selects predetermined RACH resources divided by time/frequency/code, when different terminals select the same RACH resources, reattempt may occur due to resource collision. In addition, based on half frequency division duplex (H-FDD), the terminal switches to a transmission mode of the RACH preamble, so that around the switching the terminal cannot receive downlink and uplink data allocation information granted by the BS and, as a result, a risk of resource loss may be generated.

Accordingly, the disclosure describes various embodiments for more efficiently allocating uplink resources to the terminal. For example, for the case in which there is no separate physical resource request channel, the number of resource request channels are insufficient compared to the number of terminals supporting simultaneous access, or a low-priced terminal is supported, the disclosure proposes a scheduling scheme for simplifying an uplink resource allocation procedure.

A data exchange procedure between the BS and the terminal is sequentially performed in many cases. Although not specified in the standard, it may be predicted that an uplink resource request would be made soon by observing characteristics of downlink data. Accordingly, the BS may determine a situation in which uplink transmission is predicted and allocate resources prior to a request from the terminal in various embodiments.

Figure 5:
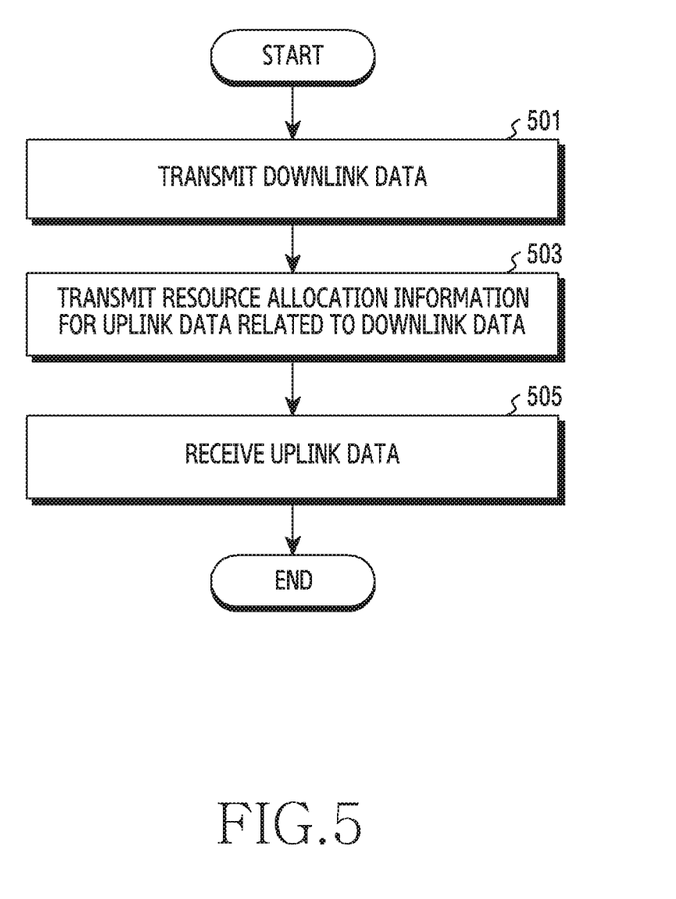
FIG. 5 is a flowchart illustrating an operation of a BS in a wireless communication system according to various embodiments of the disclosure.

FIG. 5 is a flowchart illustrating the operation of a BS in a wireless communication system according to various embodiments of the disclosure. FIG. 5 illustrates an operation method of the BS 110.

Referring to FIG. 5, in operation 501 the BS transmits downlink data. The downlink data may be transmitted through downlink resources allocated to the terminal, and information on the downlink resources (for example, downlink control information (DCI)) may be transmitted prior to transmission of the downlink data.

In operation 503, the BS transmits resource allocation information for uplink data related to the downlink data. That is, the terminal may allocate uplink resources without any request from the terminal and transmit information indicating the uplink resources. According to various embodiments, interrelationship between the uplink data and the downlink data transmitted in operation 501 may be determined on the basis of information (for example, header information) included in the downlink data, a predefined signal flow, and statistical information of downlink transmission. That is, the downlink data transmitted in operation 501 may include information/messages causing transmission of particular uplink data. In other words, the downlink data transmitted in operation 501 may allow the BS to predict uplink transmission of the terminal.

In operation 505, the BS receives uplink data. In other words, the BS receives uplink data from the terminal through uplink resources allocated without any request. However, the operation of receiving the uplink data in operation 505 may be omitted.

Figure 6:
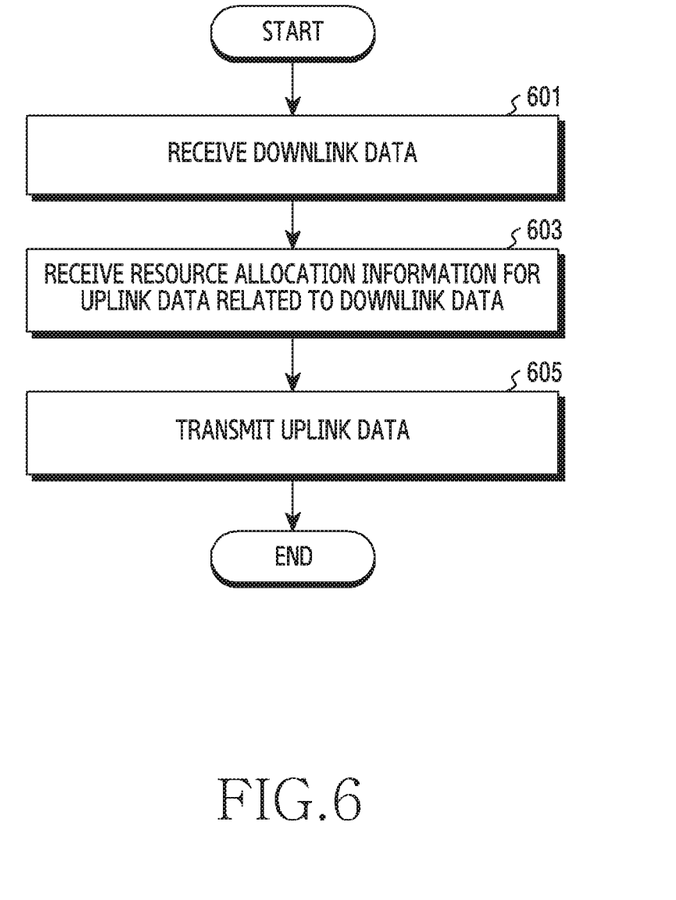
FIG. 6 is a flowchart illustrating an operation of a terminal in a wireless communication system according to various embodiments of the disclosure.

FIG. 6 is a flowchart illustrating the operation of a terminal in a wireless communication system according to various embodiments of the disclosure. FIG. 6 illustrates an operation method of the terminal 120.

Referring to FIG. 6, in operation 601, the terminal receives downlink data. The downlink data may be transmitted through downlink resources allocated to the terminal, and information on the downlink data (for example, DCI) may be received prior to reception of the downlink data.

In operation 603, the terminal receives resource allocation information for uplink data related to the downlink data. According to various embodiments, although the terminal does not make a request for uplink resources, the terminal may receive information indicating the uplink resources. Accordingly, the terminal may monitor whether the information indicating the uplink resources is received even though not making a request therefor. To this end, the terminal may perform blind decoding for detecting control information including information indicating uplink resources on a dedicated search space or a common search space. For example, the downlink data transmitted in operation 601 may include information/messages causing transmission of particular uplink data. In other words, the downlink data transmitted in operation 601 may make uplink transmission of the terminal predicted.

In operation 605, the terminal transmits uplink data. In other words, the terminal transmits uplink data to the BS through uplink resources allocated without any request. However, the operation of transmitting the uplink data in operation 605 may be omitted.

The BS may allocate uplink resources without any request on the basis of interrelationship between downlink data and uplink data according to the embodiments described with reference to FIGS. 5 and 6. Accordingly, it is possible to reduce the number of times inefficient procedures such as signaling overhead for the uplink resource request or the resource allocation request by an RACH are attempted.

Various situations in which the uplink transmission is predicted may exist according to the interrelationship between the uplink data and the downlink data. For example, when acknowledge (ACK)/negative-ACK (NACK) feedback for transmitted data is required, uplink transmission may be predicted. In general data communication, in order to guarantee a transmission/reception quality of transmitted data, an automatic repeat request (ARQ) scheme may be used or data may be exchanged in the form of a transmission control protocol (TCP) as a network protocol with a server or another terminal performing end-to-end communication with the terminal. In the data exchange, when transmission of one ARQ block or one TCP data block is completed through downlink, the BS may predict transmission of ARQ ACK/NACK or TCP ACK/NACK which is a reception success or failure response to the ARQ/TCP block through uplink. Accordingly, when the BS observes data transmitted through downlink and determines that transmission of the ARQ/TCP block is completed, the BS may predict uplink transmission. Accordingly, even though the terminal has not made a request for uplink resources, the BS may schedule uplink resources and transmit grant information, thereby making the terminal transmit ARQ/TCP ACK/NACK information for downlink.

Figure 7:
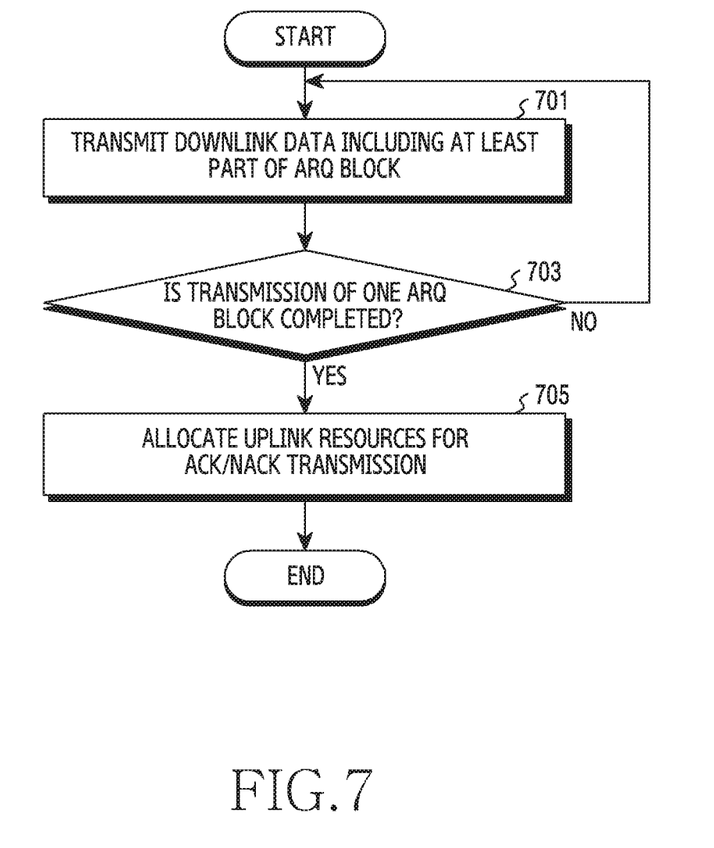
FIG. 7 is a flowchart illustrating an operation of performing scheduling on the basis of prediction of feedback information transmission in a wireless communication system according to various embodiments of the disclosure.

FIG. 7 is a flowchart illustrating the operation of performing scheduling on the basis of prediction of feedback information transmission in the wireless communication system according to various embodiments of the disclosure. FIG. 7 illustrates an operation method of the BS 110.

Referring to FIG. 7, in operation 701 the BS transmits downlink data including at least the part of the ARQ block. The downlink data may be a data unit of a layer lower than a layer on which the ARQ block is generated, and may include at least the part of the ARQ block and also control information (for example, a radio link control (RLC) header) generated on a layer different from the layer on which the ARQ block is generated. For example, the ARQ block may be transmitted after being split into a plurality of sub blocks. In another example, when the size of the ARQ block is sufficiently small, whole one ARQ block may be included in the downlink data unit.

In operation 703, the BS determines whether transmission of one ARQ block is completed. That is, the BS identifies whether all fragmentations of one ARQ block are transmitted by downlink data transmitted in operation 701 and downlink data transmitted previously. According to an embodiment, the BS may determine whether transmission of one ARQ block is completed on the basis of control information included in downlink data. Specifically, the BS may determine whether transmission of one ARQ block is completed using a polling bit included in the RLC header. According to another embodiment, the BS may determine whether transmission of one ARQ block is completed on the basis of the size of accumulation of transmitted downlink data. Specifically, after transmission of a new ARQ block starts, the BS may identify whether downlink data larger than or equal to the ARQ block size is transmitted, thereby determining whether transmission of one ARQ block is completed. In another example, the BS identifies whether downlink resources are successively allocated without allocation of uplink resources and whether an amount of data completely transmitted through the downlink resources or an amount of the downlink resources excesses a predefined maximum size, so as to determine whether transmission of one ARQ block is completed. According to another embodiment, the BS may determine whether transmission of one ARQ block is completed on the basis of a statistical time duration required for transmission of one ARQ block.

In operation 705, the BS allocates uplink resources for ACK/NACK transmission. According to an embodiment, the BS may determine the size of resources required for ACK/NACK transmission and allocate the uplink resources according to the determined size. At this time, the size of resources required for ACK/NACK transmission may be predetermined or may be determined in consideration of a channel quality of the terminal.

According to the embodiment described with reference to FIG. 7, as transmission of the ARQ block is completed, the BS may predict uplink transmission and allocate uplink resources without any request. A similar procedure may be applied to transmission of the TCP block. That is, when transmission of one TCP block is completed, the BS may allocate uplink resources for ACK/NACK transmission. Further, similar to the procedure of FIG. 7, completion of transmission of the TCP block may be determined on the basis of one of information on a TCP header, the size of accumulated transmitted data, and an elapsed time.

Figure 8:
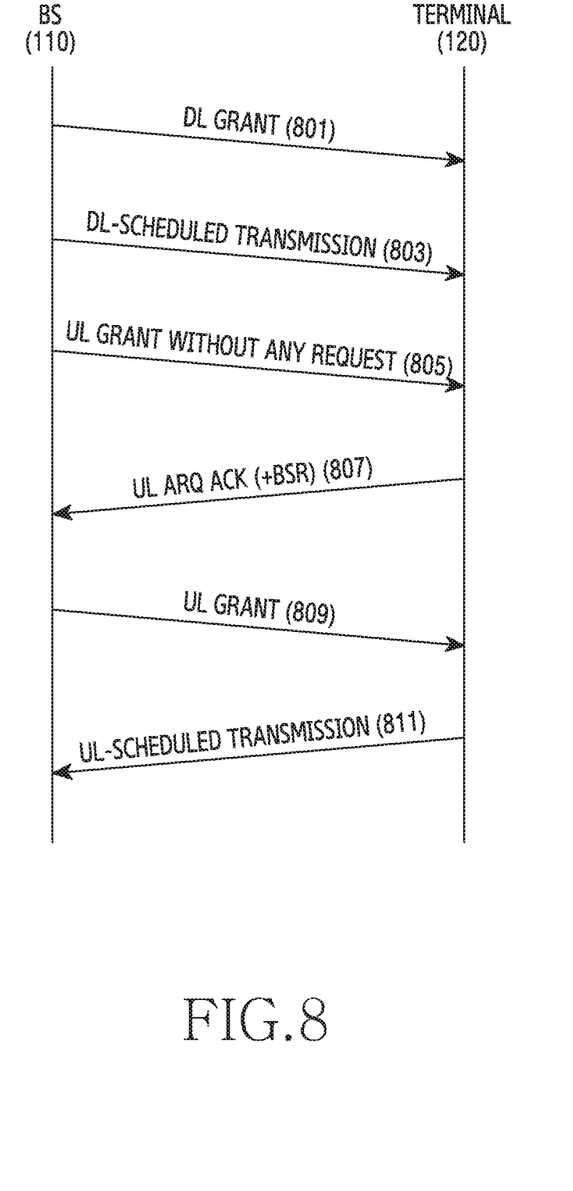
FIG. 8 illustrates a signal exchange for uplink scheduling without any request for acknowledge (ACK)/negative-ACK (NACK) transmission in a wireless communication system according to various embodiments of the disclosure.

FIG. 8 illustrates a signal exchange for uplink scheduling without any request for ACK/NACK transmission in the wireless communication system according to various embodiments of the disclosure. FIG. 8 illustrates a signal exchange between the BS 110 and the terminal 120.

Referring to FIG. 8, in operation 801 the BS 110 transmits a downlink grant to the terminal 120. In operation 803, the BS 110 performs downlink-scheduled transmission. That is, the BS 110 transmits downlink data through resources indicated by the downlink grant. The downlink data may include at least the part of the ARQ block. According to the illustrated procedure, transmission of one ARQ block is completed by the downlink data transmitted in operation 803.

In operation 805, the BS 110 transmits an uplink grant without any request (unsolicited) to the terminal 120. That is, the BS 110 transmits information indicating resources having the size required when the terminal 120 transmits ACK for the ARQ block. According to an embodiment, the uplink grant may indicate resources having the size corresponding to the ACK size. According to another embodiment, the uplink grant may indicate resources having the size larger than the ACK size.

In operation 807, the terminal 120 transmits uplink ACK to the BS 110. That is, the terminal 120 transmits ACK for the ARQ block through uplink resources allocated without any request. According to an embodiment, the terminal 120 may transmit only the uplink ACK. According to another embodiment, the terminal may transmit a BSR in addition to the uplink ACK. The BSR is information indicating the size of uplink data buffered in the terminal 120 and may be used to make a request for allocating additional uplink resources. Accordingly, the transmitted BSR may include a value indicating the size of resources to be additionally received. When the BSR is transmitted but the terminal 120 has no uplink data to be transmitted except for the uplink ACK, the terminal 120 may configure the BSR as a value indicating "0." The procedure illustrated in FIG. 8 assumes the case in which additional resources are requested through the BSR.

In operation 809, the BS 110 transmits the uplink grant to the terminal 120. The uplink grant in operation 809 may allow allocation of resources requested by the BSR. That is, the uplink grant in operation 809 is different from the uplink grant in operation 805 only with the existence or non-existence of the request. In operation 811, the terminal 120 performs the uplink-scheduled transmission.

According to the embodiment described with reference to FIG. 8, the additional resource request may be made using uplink resources allocated without any request. That is, the size of resources granted after completion of transmission of the ARQ/TCP block may be larger than an amount of minimum resources required for transmitting ARQ ACK or TCP ACK by an amount of resources through which BSR information can be transmitted. If the terminal should further transmit additional uplink data as well as ARQ/TCP ACK, the terminal may specify an amount of required resources in addition to resources reserved for BSR information and transmit information on the amount of resources to the BS, and thus further acquire uplink resources without an additional RACH procedure.

According to the above-described various embodiments, transmission of ACK/NACK information is predicted on the basis of completion of transmission of the ARQ block or the TCP block, and uplink resources for ACK/NACK information may be transmitted without any request. Accordingly, ACK/NACK information for the ARQ block or the TCP block may be rapidly transmitted without allocation of uplink resources.

According to another embodiment, uplink transmission may be predicted within a series of signal procedures. For example, uplink transmission may be predicted during a message exchange according to a call flow. Embodiments related to the prediction of uplink transmission according to the signal procedure will be described below with reference to FIG. 9.

Figure 9:
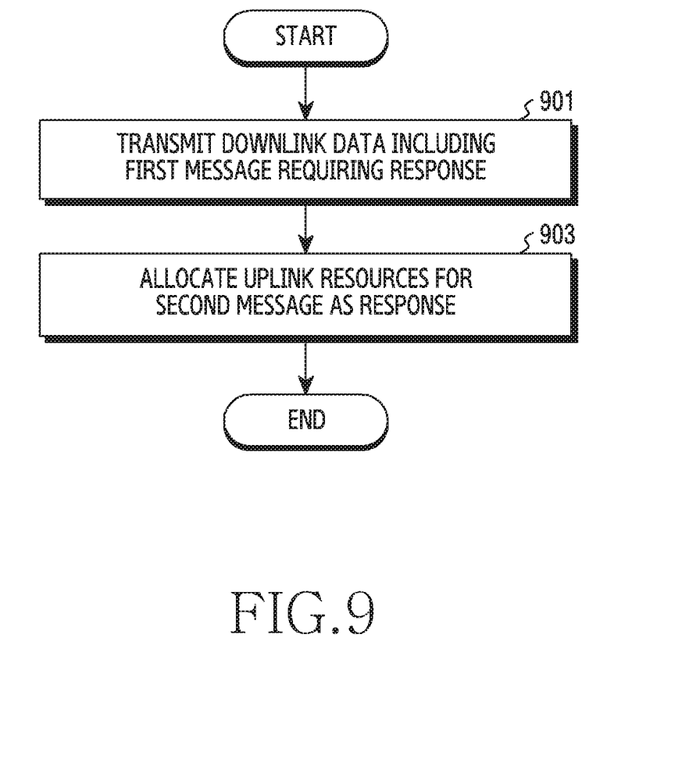
FIG. 9 is a flowchart illustrating an operation for performing scheduling on the basis of prediction of message transmission in a wireless communication system according to various embodiments of the disclosure.

FIG. 9 is a flowchart illustrating the operation for performing scheduling on the basis of prediction of message transmission in the wireless communication system according to various embodiments of the disclosure. FIG. 9 illustrates an operation method of the BS 110.

Referring to FIG. 9, in operation 901, the BS transmits downlink data including a first message requiring a response. The first message may be a message transmitted to perform a particular procedure (for example, a call procedure, an attachment procedure, or an initial access procedure) defined on the standard. For example, the first message may be a message of a layer (for example, a radio resource control (RRC) layer) higher than a layer on which resource allocation is performed.

In operation 903, the BS allocates uplink resources for a second message as a response. That is, the BS may allocate resources for the second message defined to be transmitted through uplink after the first message downlink-transmitted in operation 901. The first message and the second message may have interrelationship between a request and a response or interrelationship between an indication and a completion report. That is, the BS may monitor a transmitted downlink message and, when the monitored message is a message having a relevant next uplink message, allocate uplink resources for the next uplink message without any request from the terminal.

Referring to FIG. 9, according to the above-described embodiment, uplink transmission may be predicted on the basis of a predetermined signaling procedure. Accordingly, in various situations in which messages are paired with each other, the scheduling scheme according to the various embodiments can be applied as well as the data block and feedback (for example, ACK).

According to an embodiment, as an example of the situation to which the procedure of FIG. 9 can be applied, an attachment procedure may be considered. For example, when downlink transmission of an authentication request message is completed, uplink resources for an authentication response message may be allocated without any request. In another example, when downlink transmission of a security mode command message is completed, uplink resources for a security mode complete message may be allocated without any request.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within an electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station (BS) in a wireless communication system, the method comprising:
  transmitting, to a terminal, downlink data;
  allocating an uplink resource without a scheduling request from the terminal, wherein an amount of the uplink resource is greater than a resource amount for uplink data related to the downlink data;
  transmitting control information indicating the uplink resource to the terminal;
  receiving, from the terminal, the uplink data and information that makes a request for allocating an additional uplink resource through the uplink resource; and
  transmitting, to the terminal, an uplink grant for allocation of the additional uplink resource based on the received information.

2. The method of claim 1, wherein the allocating of the uplink resource for the uplink data related to the downlink data comprises:
- determining, by the BS, whether an interrelationship between the downlink data and the uplink data exists by monitoring transmitted downlink messages; and
- if the BS determines that the interrelationship between the downlink data and the uplink data exists, allocating the uplink resource for the uplink data without any request from the terminal based on the interrelationship.

3. The method of claim 1, wherein the uplink data comprises feedback information for information included in the downlink data or a second message paired with a first message included in the downlink data.

4. The method of claim 1, further comprising:
- determining whether to allocate the uplink resource based on at least one piece of information included in the downlink data, a predetermined signal flow, and statistical information of downlink transmission.

5. The method of claim 1, wherein the uplink resource is allocated in response to one of a completion of a transmission of an automatic repeat request (ARQ) block, a completion of a transmission of a transmission control protocol (TCP) data block, or a transmission of a message requiring a response.

6. The method of claim 5, wherein the completion of the transmission of the ARQ block is determined based on at least one of a value of a polling bit included in a header, a size of accumulation of transmitted downlink data, or a statistical time duration required for transmission of one ARQ block.

7. A base station (BS) in a wireless communication system, the BS comprising:
- a transceiver; and
- at least one processor connected to the transceiver and configured to:
  - transmit downlink data to a terminal,
  - allocate an uplink resource without a scheduling request from the terminal, wherein an amount of the uplink resource is greater than a resource amount for uplink data related to the downlink data,
  - transmit, to the terminal, control information indicating the uplink resource,
  - receive, from the terminal, the uplink data and information that makes a request for allocating an additional uplink resource through the uplink resource, and
  - transmit, to the terminal, an uplink grant for allocation of the additional uplink resource based on the received information.

8. The BS of claim 7, wherein the at least one processor is further configured to:
- determine whether an interrelationship between the downlink data and the uplink data exists by monitoring transmitted downlink messages, and
- if it is determined that the interrelationship between the downlink data and the uplink data exists, allocate the uplink resource for the uplink data without any request from the terminal based on the interrelationship.

9. The BS of claim 7, wherein the uplink data comprises feedback information for information included in the downlink data or a second message paired with a first message included in the downlink data.

10. The BS of claim 7, wherein the at least one processor is further configured to determine whether to allocate the uplink resource based on at least one piece of information included in the downlink data, a predetermined signal flow, and statistical information of downlink transmission.

11. The BS of claim 7, wherein the uplink resource is allocated in response to one of a completion of a transmission of an automatic repeat request (ARQ) block, a completion of a transmission of a transmission control protocol (TCP) data block, or a transmission of a message requiring a response.

12. The BS of claim 11, wherein the completion of the transmission of the ARQ block is determined based on at least one of a value of a polling bit included in a header, a size of accumulation of transmitted downlink data, or a statistical time duration required for transmission of one ARQ block.

13. A terminal in a wireless communication system, the terminal comprising:
- a transceiver; and
- at least one processor coupled to the transceiver and configured to:
  - receive downlink data from a base station (BS),
  - receive control information indicating an uplink resource from the BS, wherein an amount of the uplink resource is greater than a resource amount for uplink data related to the downlink data,
  - transmit, to the BS, the uplink data and information that makes a request for allocating an additional uplink resource through the uplink resource, and
  - receive, from the BS, an uplink grant for allocation of the additional uplink resource based on the received information,
- wherein the uplink resource is allocated by the BS without a scheduling request from the terminal.

14. The terminal of claim 13, wherein the uplink data comprises feedback information for information included in the downlink data or a second message paired with a first message included in the downlink data.

15. The terminal of claim 13, wherein the at least one processor is further configured to transmit the uplink data and information that makes a request for allocating an additional uplink resource through the uplink resource.

16. The terminal of claim 13, wherein the uplink resource is allocated in response to one of a completion of a transmission of an automatic repeat request (ARQ) block, a completion of a transmission of a transmission control protocol (TCP) data block, or a transmission of a message requiring a response.

* * * * *